United States Patent [19]

Kowalski et al.

[11] Patent Number: 5,999,923
[45] Date of Patent: Dec. 7, 1999

[54] METHODS AND APPARATUS FOR OPTIMIZING DECISION MAKING

[75] Inventors: Thaddeus Julius Kowalski, Summit, N.J.; Maria Jesus Peman, Colmenar Viejo, Spain; James R. Rowland, Short Hills, N.J.

[73] Assignee: Lucent Technologies Inc., Murray Hill, N.J.

[21] Appl. No.: 08/482,962

[22] Filed: Jun. 15, 1995

Related U.S. Application Data

[63] Continuation of application No. 08/086,437, Jun. 30, 1993, abandoned.

[51] Int. Cl.$^6$ .................................................. G06F 17/00
[52] U.S. Cl. .............................. 706/47; 706/61; 395/51; 395/54
[58] Field of Search .................................. 395/51, 64, 52, 395/60; 706/61, 60, 55, 45, 46, 47, 48, 50

[56] References Cited

U.S. PATENT DOCUMENTS

| | | | |
|---|---|---|---|
| 4,959,799 | 9/1990 | Yoshiura et al. | 395/51 |
| 5,005,143 | 4/1991 | Altschuler et al. | 395/51 |
| 5,014,327 | 5/1991 | Potter et al. | 382/14 |
| 5,047,951 | 9/1991 | Ono | 395/64 |
| 5,121,467 | 6/1992 | Skeirik | 395/11 |
| 5,129,037 | 7/1992 | Kirk et al. | 395/64 |

FOREIGN PATENT DOCUMENTS

| | | | |
|---|---|---|---|
| A-O 254 825 | 2/1988 | European Pat. Off. | G06F 15/18 |
| A-O 301 334 | 2/1989 | European Pat. Off. | G06F 9/44 |
| A-O 435 476 | 7/1991 | European Pat. Off. | G06F 15/403 |

OTHER PUBLICATIONS

IBM Technical Disclosure Bulletin, vol. 31, No. 1, "Robust Method fro Training Sequential Decision–Making For Artificial Intelligence Systems" pp. 329–332, Jun. 1988.

"Robust Method for Training Sequential Decision–Making for Artificial Intelligence Systems", IBM Technical Disclosure Bulletin, vol. 31, No. 1, Jun. 1988, pp. 329–332, XP 000049712.

"Predictive Method of Controlling Artificial Intelligence Search by Exploration and Ordering", IBM Technical Disclosure Bulletin, vol. 32, No. 7, Dec. 1, 1989, pp. 446–448, XP 000078151.

C. L. Forgy, "Rete: A Fast Algorithm for the Many Pattern/Many Object Pattern Match Problem", Artificial Intelligence, North Holland, pp. 17–37, 1982.

L. Brownston, R. Farrell, E. Kant, N. Martin, Programming Expert Systems in OPS5, An Introduction to Rule–Based Programming, Addison–Wesley Publishing Company, Reading, MA 1985.

Binary Decision Tree Test Functions S. Aborhey, IEEE Nov. 1988.

Decision Rules for distributed decision networks with uncertainties E. Drakopoulos IEEE Jan. 1992.

*Primary Examiner*—Allen R. MacDonald
*Assistant Examiner*—Richemond Dorvil

[57] ABSTRACT

Techniques for optimizing decision making apparatus by instrumenting the apparatus and running it on test data which has the characteristics of the data upon which the decision making apparatus is to be used. The information provided by the instruments is then used to reorder the application of the criteria used by the decision making apparatus to the data. The techniques are applied in rule-based system which employs a decision network to evaluate the rules. The decision network is instrumented and the rule-based system is run on the test data. The results returned by the instrumentation are used to determine how to rearrange condition elements in the rules so that the flow of data through the decision network is minimized. The condition elements are then rearranged in that fashion and the modified rule-based system is employed on real data.

30 Claims, 7 Drawing Sheets

FIG. 1
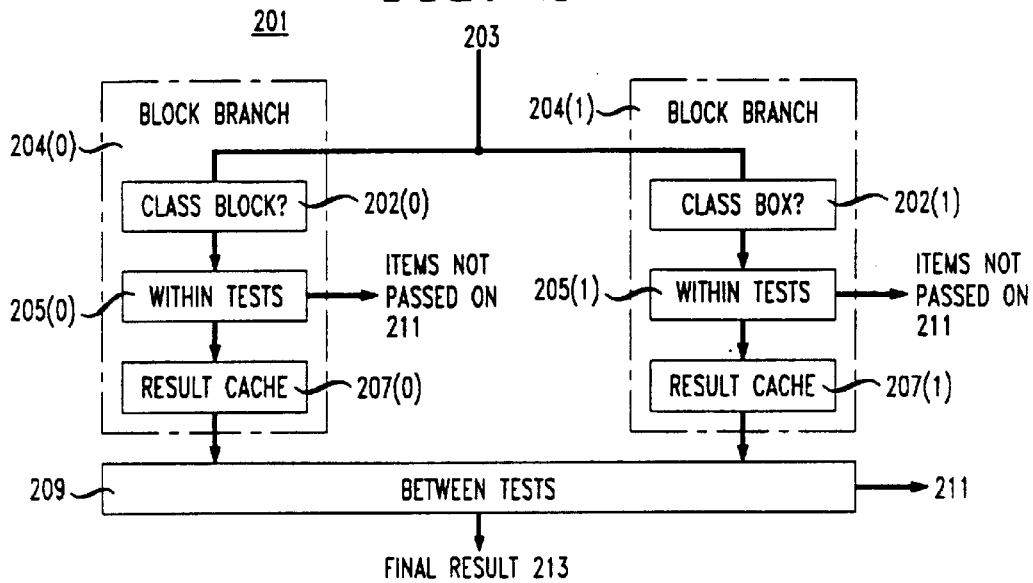
FIG. 2
FIG. 4
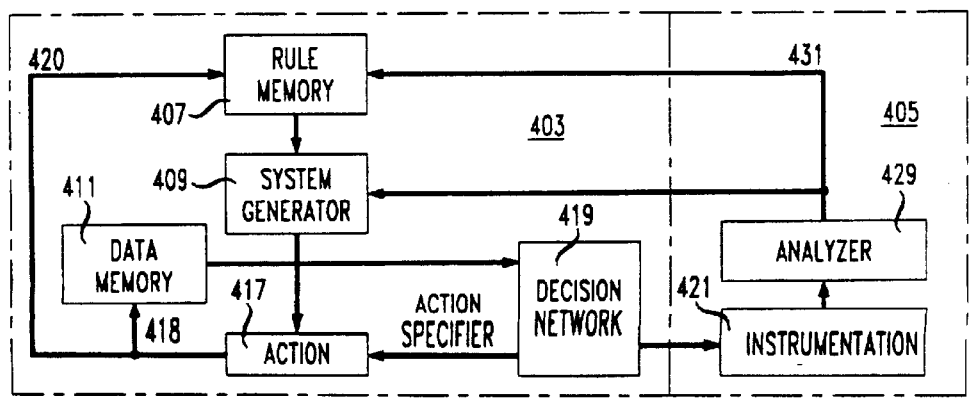

FIG. 6

```
                                                              603(0)
(P TRIM-ADD-SUB-MUL-OUTPUT
 (CONTEXT ^STATUS ACTIVE ^OPERATION TEMP-VARIABLE-ALLOCATION)   ; 0
 (OPERATOR ^OPCODE << + - * >> ^INPUTS <IN> ^OUTPUTS <OUT>)     ; 1
 (LISTS ^ID <IN> ^LIST <SRC1> <SRC2>)                           ; 2
 (LISTS ^ID <OUT> ^LIST <OUTPU>)                                ; 3
 (OUTNODE ^ID <SRC1>)                                           ; 4
 (OUTNODE ^ID <SRC2>)                                           ; 5
601
 {(OUTNODE ^ID <OUTPU> ^BITS <BO>) <O>}                         ; 6
 (OPERATOR ^OPCODE BIT-R ^INPUTS <BITIN> ^OUTPUTS <BITOU>)      ; 7
 (LISTS ^ID <BITIN> ^LIST <OUTPU> <BITSR2>)                     ; 8
 (LISTS ^ID <BITOU> ^LIST <BITOUP>)                             ; 9
 (OUTNODE ^ID <BITSR2> ^VALUE 0)                                ; 10
 (OUTNODE ^ID <BITOUP> ^BITS {<BITBO> <<BO>})                   ; 11
-->
 (MODIFY <O> ^BITS <BITBO>))
```

FIG. 7

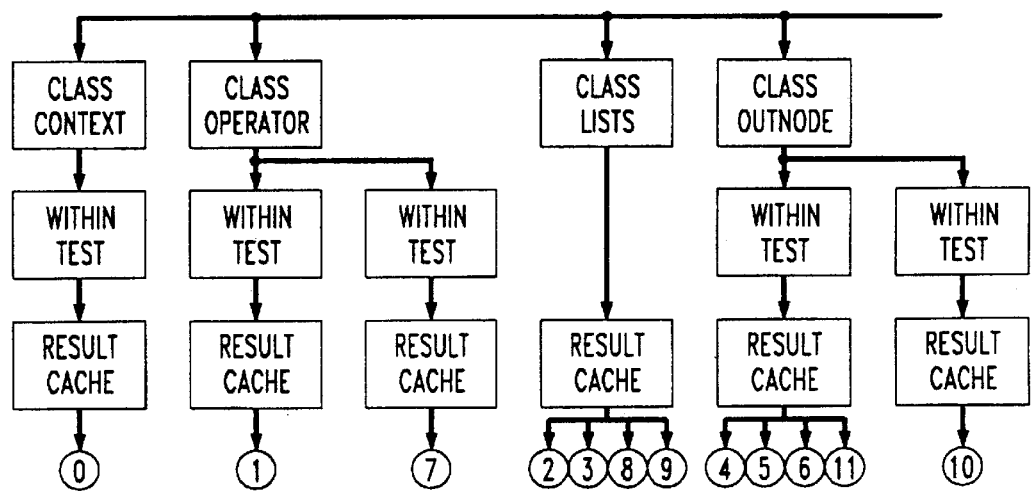

FIG. 10

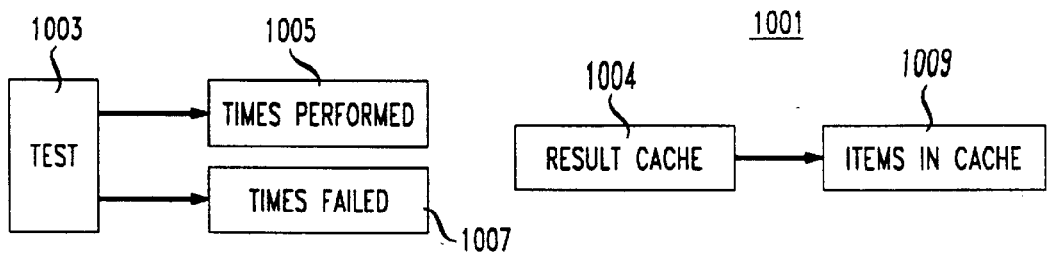

FIG. 11

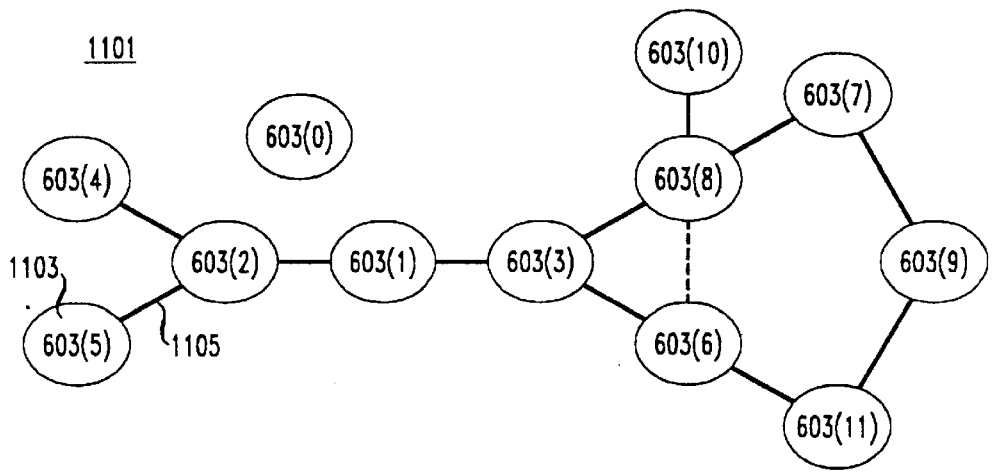

FIG. 12

```
FOR EACH RULE R IN THE SYSTEM {
    FOR EACH CONDITION ELEMENT |S(CE) IN R          1201
        CALCULATE RESTRICTIVENESS OF |S(CE) ⁓1203
    ┌ WHILE THERE ARE |S(CE)S LEFT {
    │       ┌GET A LEADER AND ADD IT TO LIST-OF-SELECTED
    │   1205┘ADD TO LIST-OF CANDIDATES THE SUCCESSORS OF THE LEADER THAT
    │         HAVE NOT BEEN SELECTED YET
1204┤       WHILE THERE ARE CANDIDATES {
    │         ┌RE-EVALUATE THE ESTIMATE OF THE CROSS PRODUCTS
    │      1207┘SELECT A |S(CE) FROM THE CANDIDATES AND ADD IT TO LIST-OF-SELECTED
    │           ADD TO LIST-OF-CANDIDATES THE SUCCESSORS OF THE SELECTED |S(CE)
    │             THAT HAVE NOT BEEN SELECTED YET
    └       }
        }
    ┌ VERIFY THE SEQUENCE
    │ WHILE THE SEQUENCE IS ILLEGAL {
1209┤     MOVE THE |S(CE) THAT IS IN THE WRONG POSITION
    │         TO THE POSITION FOLLOWING ITS RELATED |S(CE)
    │     VERIFY THE SEQUENCE
    └ }
}
```

METHODS AND APPARATUS FOR OPTIMIZING DECISION MAKING

This application is a continuation of application Ser. No. 08/086,437, filed on Jun. 30, 1993, now abandoned.

BACKGROUND OF THE INVENTION

The invention relates to data processing generally and more specifically to data processing involving decisions based on the values of data.

1. Field of the Invention

2. Description of the Prior Art

Many data processing operations involve making decisions about data items based on a list of criteria concerning the data items. For example, a system which sorted blocks according to color and weight might want to sort out blocks which were black and had a weight between 1 and 3 pounds. There are thus three criteria by which a block will be selected:

Is its color black?

Does it weigh less than 1 pound?

Does it weigh more than 3 pounds?

How long it takes to sort a given block will depend on how the criteria are ordered. For example, if a block is white, only the first criterion need be applied; if it is black, but weighs less than 1 pound, the first two must be applied; if it is black and weighs more than 1 pound, all three must be applied.

It is also clear from the foregoing example that the most efficient ordering of the criteria will depend on the characteristics of the blocks being sorted. For example, if almost all of them are black and weigh less than 1 pound, the criteria should be ordered with "Does it weigh less than 1 pound" first. If, on the other hand, very few of the blocks are black but almost all of them weigh between 1 and three pounds, the criteria should be ordered with "Is its color black?" first.

In many cases, data processing systems apply long lists of criteria to data. When this is so, the performance of the data processing system depends crucially on the efficient ordering of the criteria. In the prior art, such orderings have been produced by skilled programmers with detailed knowledge both of the system which is applying the criteria and of the data to which the criteria have been applied. There are two difficulties with this procedure: it takes time and effort on the part of the skilled people, and the analysis must be redone each time the data the system is dealing with changes. What is lacking, and what is supplied by the present invention, is an automatic technique for ordering the criteria applied to data according to the nature of the data being processed.

SUMMARY OF THE INVENTION

The invention solves the foregoing problem by including an optimization component in the data processing system. The optimization component analyzes the application of the criteria to the data the system is presently dealing with and uses the results of the analysis to reorder the application of the criteria to the data so that the number of tests made and the resources required to make them are reduced. The optimization component includes instrumentation which obtains information about how the criteria are being applied to the data and an analyzer which analyzes the information provided by the instrumentation. Optimization is done by running the data processing system on a sample of the data the system is presently dealing with, and then providing the information collected by the instrumentation to the analyzer, which analyzes the information and reorders the manner in which the criteria are applied.

The foregoing and other objects and advantages of the invention will be apparent to one of ordinary skill in the art who peruses the following Drawing and Detailed Description, wherein:

BRIEF DESCRIPTION OF THE DRAWING

FIG. 1 is an example of a rule;

FIG. 2 is an example of a decision network;

FIG. 4 is a block diagram of an embodiment of the invention;

FIG. 6 is another example rule;

FIG. 7 is a first part of a decision network made from the rule of FIG. 6;

FIG. 10 is a block diagram of the instrumentation in a preferred embodiment;

FIG. 11 is a diagram of the graph employed in the invention;

FIG. 12 is pseudo-code for an algorithm employed in the preferred embodiment.

Figure 3:
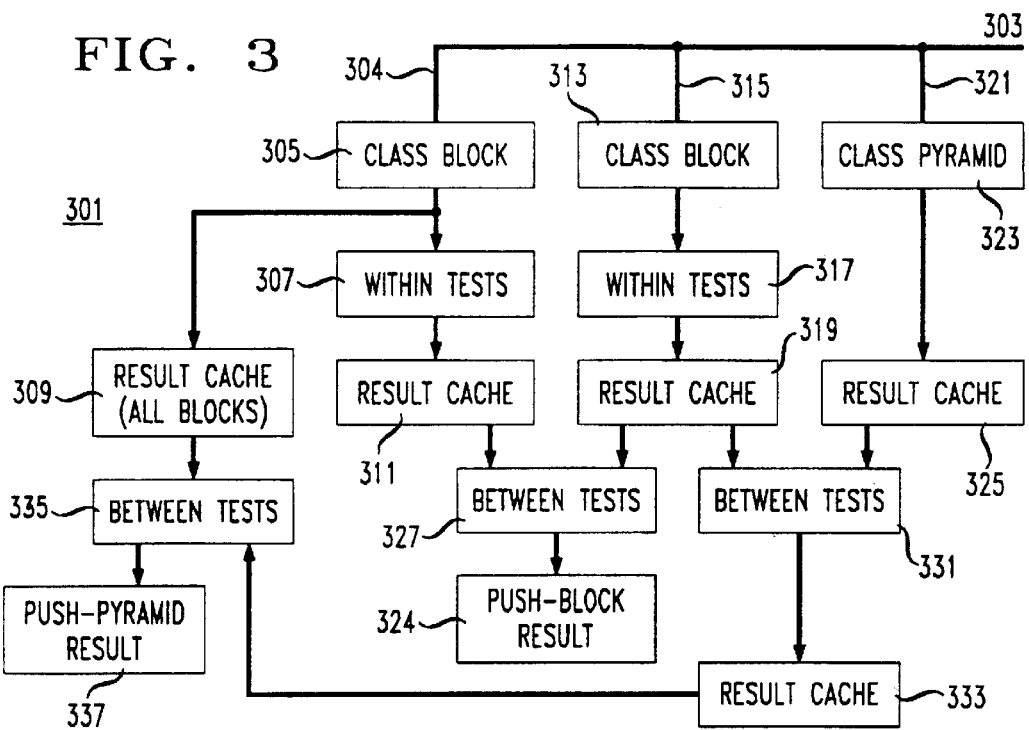
FIG. 3 is an example of a second decision network.

The reference numbers employed in the Drawing and the Detailed Description have three or more digits. The two least significant digits are a number within a figure; the remaining digits are the figure number. Thus, the element with the reference number "305" is first shown in FIG. 3.

Detailed Description

The following Detailed Description will begin with an overview of the invention and will then present a detailed description of a presently-preferred embodiment which is employed to optimize a rule-based system.

Overview of the Invention

The following Overview will first present an example of the kind of application in which the invention is employed, and will then show how the invention is used in such an application.

Rule-based Systems and Rules

A typical example of a data processing operation which involves decisions is a rule-based system. In such a system, data is applied to a set of rules which specify conditions which may be satisfied by the data and actions which are taken if the conditions are satisfied. FIG. 1 shows a rule 101 of the type used in such systems. The name of this rule is push_block. It has a left-hand side 103 which specifies the conditions and a right-hand side 105 which specifies actions to be taken. In this case, there is a single action 109. The conditions in left-hand side 103 are matched when the data the rule is being applied to specifies a block and a box such that the block and the box have the same color, the block weighs less than 3.0 and is on the floor and the box weighs more than 3.0. When the action of the right-hand side is executed, the block is placed onto the box by changing the part of the data for the block which specifies what the block is on so that it specifies that the block is on the box.

Continuing in more detail, left-hand side 103 has two condition elements, 107(0) and 107(1). Each condition element 107 specifies a set of conditions which must be fulfilled if the action on the right-hand side is to be taken. In 107(0), block 117 specifies the class of data the condition element is to be applied to; each name beginning with "^" specifies an attribute of that kind of data; for example, ŵeight specifies the weight of the block; what follows specifies a test which is applied to that attribute; thus, ^weight <3.0 specifies that the block's weight must be less than 3.0, while ^color <var> specifies that the block must have a color specified by a variable. <blockl>, finally is a name used within the rule 101 to specify a block which satisfies condition element 107(0).

For purposes of the present discussion, the tests applied to the attributes in a condition element 107 fall into two classes: within tests, where the result of the test for the rule can be determined solely from information contained in the attributes of the data item being tested in the condition element, and between tests, where the result of the test must be determined using attributes from more than one data item. For example, the test ŵeight <3.0 is a within test 111, since all of the information is contained in the item of class block being tested. The tests ^color <var> of condition element 107(0) and ^color <var> of condition element 107(1), both labelled 113, are examples of between tests, since the value of the color attribute for both a given block and a given box must be known before it can determined whether the block and box have the same color.

Using Decision Networks to do Matching

As may be seen from the foregoing discussion of rule 101, rule-based systems spend a great deal of time performing tests on data items. An efficient technique for ordering the performance of the tests is the decision network. The type of decision network used in a preferred embodiment is a Rete network, which is discussed in detail in Forgy, C. L., "Rete: A Fast Algorithm for the Many Pattern/Many Object Pattern Match Problem," *Artificial Intelligence* (1982). FIG. 2 shows a decision network 201 for rule 101. Data items to be tested in decision network 201 come in via 203. As shown in elements 202(0) and 202(1), each data item is first tested for its class, in this case, whether it is a block or box. For each class, there is a branch 204 in the decision network. In FIG. 2, branch 204(0) is for block data items and branch 204(1) is for box data items. Each branch contains within tests 205 for the branch's data item; thus, in this case, within tests 205(0) contains the within tests 111 for block data items from condition element 107(0), while within tests 205(1) contains the within tests 111 for box data items from condition element 107(1). If a data item of the given class does not pass a within test, it goes no further in the decision network, as shown by arrow 211. Data items of the given class which pass all of the within tests in the given set of tests 205 go to result cache 207, where they are stored. Result cache 207(0), for example, contains the block data items which satisfy the within tests in 205(0). Such block data items are block data items of any color which weigh less than 3.0 and are on the floor.

If there are between tests involving the data items in the result caches 207, the data items go to between tests 209, which in this case is a single test, namely test 113, performed on the ^color attribute of the boxes and blocks of result caches 207(0) and 207(1). Test 113 must be performed for each block on each of the boxes; each time the test is performed for a block and a box, the variable <var> of the between test is bound to the colors of the block and box being compared. As is apparent from the foregoing, the number of between tests which must be performed is the cross product of the number of data items in the result caches 207 which are providing data items to between tests 209. For example, if ten blocks pass within tests 205(0) and five boxes pass within tests 205(1), fifty tests must be performed. Blocks which do not have boxes of the same color and vice-versa go no further (arrow 211), and the remaining blocks and boxes are final result 213.

The decision network of FIG. 2 is for a single rule; a decision network may also be used for sets of rules. FIG. 3 shows a single decision network 301 for the rule of FIG. 1 and the following rule:

```
(p push_pyramid
    (box id <id1> ^weight > 3.0 ^color <col> ^material <mat>)
    { (pyramid ^color <col> ^material <mat>) <pyr>}
    - (block ^on <id1>)
    -->
    (modify <pyr> ^on <id1>))
```

The rule says that if there is a box which has no block on it-(block ^on <idl>), the box weighs more than 3.0, and the box and the pyramid are made of the same material and have the same color, the pyramid is to be placed on top of the box.

Turning to FIG. 3, network 301 receives data items on 303. Since this time, there are items of the block, box, and pyramid classes, there are three branches, 304, 313, and 321. At the top of each branch there is a test for the class (elements 305, 315, and 323). Beginning with branch 304 for blocks, the push_pyramid rule requires that boxes which have passed the within tests for boxes and the between tests for boxes and pyramids be tested to determine whether they already have a block on them. Consequently, all of the block data items must be saved in result cache 309 for later use. Thereupon, the within tests for blocks from both of the rules are applied to the blocks at box 307 and those blocks which pass are stored in cache 311.

Continuing with branch 313 for boxes, again, the within tests for both of the rules which apply to boxes are in box 317, and the data items which pass the tests are stored in result cache 319. With data items of class pyramid, there are between tests, but no within tests, so all such data items are stored in result cache 325.

Block 327 has the between tests for blocks and boxes, and for those data items which pass the tests of block 327, block 329 performs the action specified in the rule, which is placing the block on the box. It should be noted here that performing the action affects the attributes of the blocks stored in result cache 309. Block 331 has the between tests for boxes and pyramids; the boxes and pyramids which pass are stored in result cache 333; then between test 335 checks each of the boxes from result cache 333 to determine whether one of the blocks in result cache 309 is on top of the box. If not, the action of the second rule changes the attribute of the proper pyramid so that the pyramid is now on the box (337).

Increasing the Efficiency of the Network

Since every data item which the rule-based system works on must go through a decision network, the efficiency of the decision network is crucial to the efficiency of the rule-based system as a whole. One way of increasing the efficiency of the decision network is to order the tests it performs so that the total number of tests is reduced. That can be achieved by minimizing the flow of data items through the network. In the preferred embodiment, the flow of data items is minimized by ordering the condition elements 107 into cross product groups of decreasing condition element significance and ordering the condition elements within each cross product group on the basis of cross product effect.

A cross product group of condition elements is a set of condition elements which share a between test; thus condition elements 107(0) and 107(1) belong to a cross product group. The cross product effect is the effect the condition element has on reducing the size of cross products further down the decision network.

The condition element significance of a cross-product group is the significance of the most significant condition element in the cross-product group. The significance of a condition element is determined in a preferred embodiment by:

the number of data items which fail the tests in the condition element;

its effect on the size of result caches which follow the condition element's tests in the network;

its effect on the short-term residence of data items in the following result caches; and the probability that the tests in the condition element will be applied to a data item.

The last of the above factors simply reflects the fact that the further from the top of the decision net a test is, the less likely it is that the test will be applied to a given data item.

The condition element significance is determined from these factors according to the following principle: The more data items which fail the tests, the smaller the result caches, the less short-term residence of data items, and the greater the probability that a test will be applied to a data item, the greater the significance of the condition element.

Overview of a Decision Making System

FIG. 4 is an overview of a decision making system 401 incorporating the invention. Portion 403 of the Figure shows a decision making system of a type which is well-known in the art. Decision making system 403 includes rules memory 407 which stores a set of rules 101. As previously described, the rules 101 in rule memory 407 determine how system 403 deals with data items. The rules in rule memory 407 are used by system generator 409 to generate the actual system which processes the data. System generator 409 may be a compiler or an interpreter. System generator 409 generates two components of the system from the rules: actions 417, which is executable code for the actions which the system will perform when the right-hand side of a rule is executed, and decision network 419, which is the decision network 201 for the set of rules in rules memory 407.

Operation of decision making system 403 is as follows: A user of the system loads a set of previously-written rules into rules memory 407. System generator 409 then uses the rules to generate the code for actions 417 and to make a decision net 419 to perform the tests prescribed by the tests in the rules. When the code 417 and the decision net 419 have been generated, system 403 is ready to run. The system provides a stream of data items previously loaded into data memory 411 to decision net 419, which performs tests on the data as previously described. If a data item passes through to the bottom of decision network 419, the code in actions 417 is executed to perform the actions. The actions can involve changes to data items in data memory 411 and changes to the rules in rule memory 407, as shown by arrows 418 and 420, respectively. For a detailed account of a system like the one just described, see Brownston, L., Farrell, R., Kant, D., and Martin, N., *Programming Expert Systems in OPS5: An Introduction to Rule-Based Programming,* Addison-Wesley, Reading, Massachusetts, 1985.

Dynamically Optimizable Decision Making System 401

When the present invention is being used to optimize performance of decision making system 403, the elements shown in portion 405 of FIG. 4 are added to produce dynamically optimizable decision making system 401. The components are the following: instrumentation 421, which is applied to decision network 419 to determine the flow of data items within decision network 419, and analyzer 429, which analyzes the results provided by instrumentation 421 and then, as shown by arrow 431, reorders the rules 101 in rule memory 407 so that when system generator 409 next generates decision net 419 from the rules in rule memory 407, a more efficient decision net 419 results.

Figure 5:
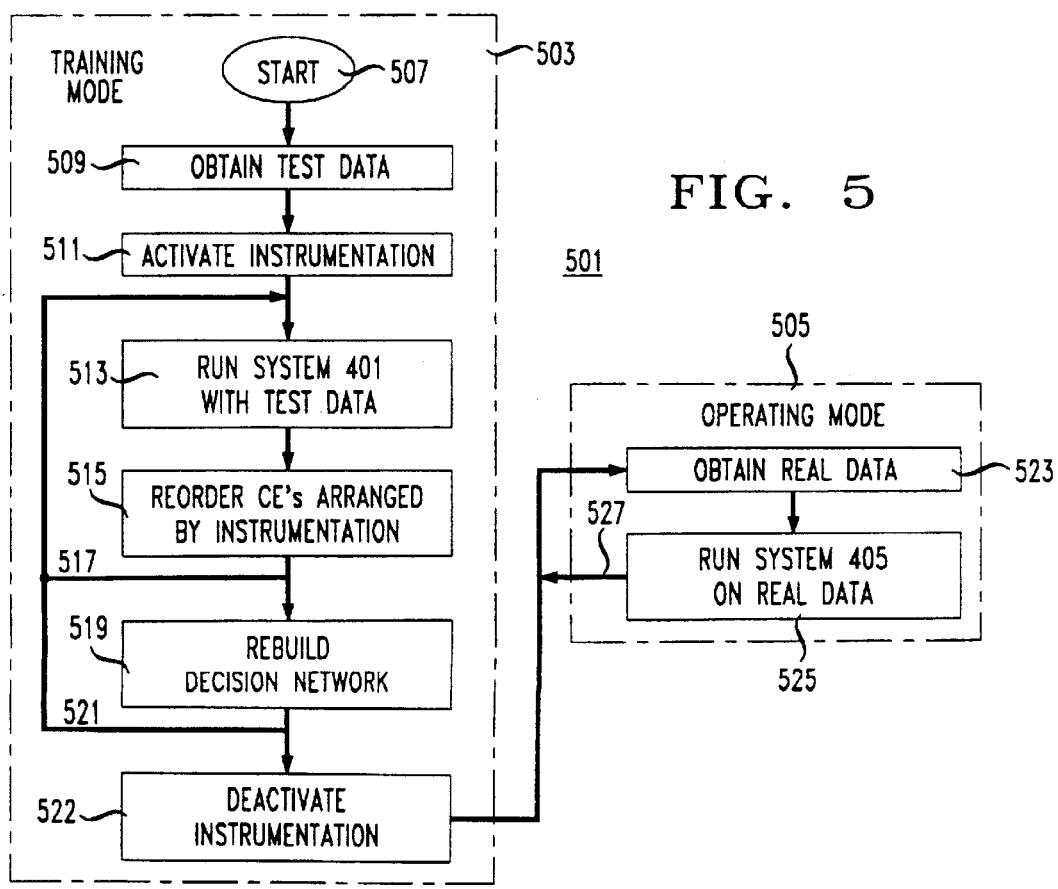
FIG. 5 is a flowchart of the operation of the invention.

Operation of system 401 is shown in flow chart 501 of FIG. 5. There are two modes of operation: training mode 503, in which the information needed to optimize decision network 419 is gathered and the network is optimized, and operating mode 505, in which the system is operated with the optimized decision network 419. In training mode 503, the user of the system first obtains sample data which has the characteristics of the data upon which the optimized system 403 will be employed (509). Then instrumentation 421 is activated (511), and when the system is run on the sample data, analyzer 429 reorders the rules in rules memory 407 as required by the behavior of decision net 419 with the sample data (513). System 401 may be run several times in training mode (loop 517) and the automatic reordering of the rules provided by the training mode may be combined with hand reordering by the user. When the reordering is complete, the decision network 419 is rebuilt (519) as required by the reordered rules in rule memory 407. At this point, optimization may continue with the rebuilt decision network 419 (loop 521) or the instrumentation may be deactivated (522) and the system run in operating mode 505. In operating mode, the system is run (525) on its usual data (523).

Preferred Embodiment of the Invention

The following detailed description of a preferred embodiment of instrumentation 421 and analyzer 429 will show in detail what kind of instrumentation is used for optimization and how the information from the instrumentation is used to perform the optimization.

An Example Rule and its Decision Net

Throughout this description, rule 601 shown in FIG. 6 will serve as an example. Rule 601 is taken from a high-level synthesis system. It determines from analysis of the later use of a result produced by an add, subtract, or multiplication operation how many bits the result must have and then selects the right addition, subtraction, or multiplication hardware to perform the operation. Rule 601's left hand side has 12 condition elements 603, which will be referred to in the following by the reference number 603 followed by the number of the condition element. Thus, condition element 603(2) is the third condition element in FIG. 6

Figure 8:
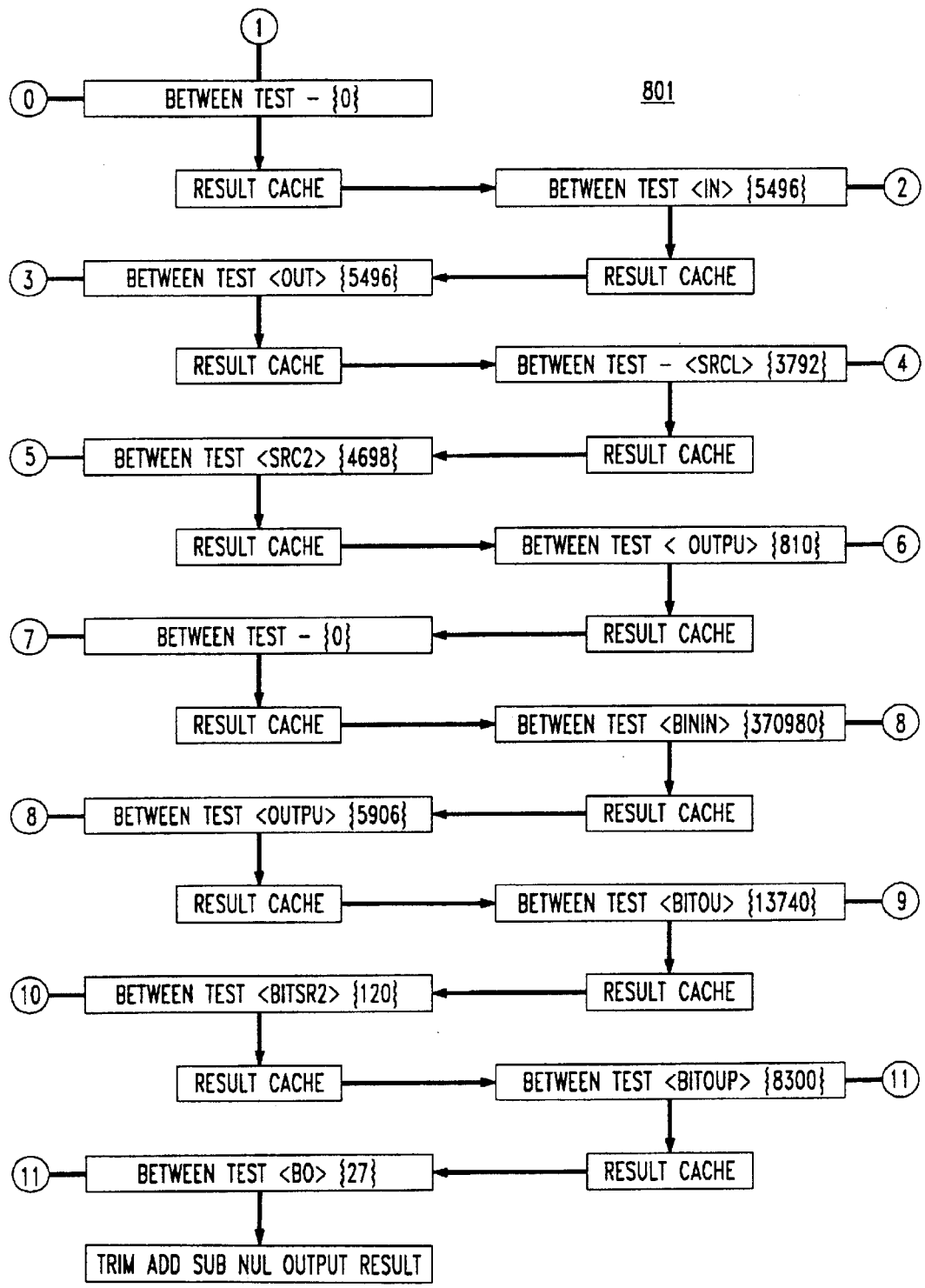
FIG. 8 is a second part of the decision network of FIG. 7.

FIGS. 7 and 8 show decision net 801 produced by decision making system 401 prior to optimization. The portion 701 of decision net 801 shown in FIG. 7 is the same before and after optimization, except that optimization may also change the order of tests in a given set of within tests. The numbered outputs of FIG. 7 appear in FIG. 8 as inputs to between test nodes. For example, outputs 0 and 1 in FIG. 7 are inputs to the first between test in FIG. 8. In FIG. 8, the name in angle brackets in each between test is the name of the variable whose bindings are being tested. The numbers in curly braces indicate the number of tests performed in the node for the sample data sets. As can be seen from FIG. 8, the number of tests performed ranges from 0 to 370,980 and the total number of tests is 419,373. Further, the largest numbers of tests, namely 370,980 and 13,740, come relatively far down in the decision network.

Instrumenting Decision Net 419

As previously explained, optimization of decision net 419 involves determination of condition element significance for each condition element, the ordering of the condition elements into condition element groups, and the determination of the cross product effect of each condition element in a cross product group. Determination of the condition element significance of each condition element and its cross product effect is done using values obtained by instrumenting decision net 419. FIG. 10 shows the instrumentation 1001 used in a preferred embodiment. The instrumentation takes the form of counters. There are three sets of counters:

- For each within test or between test 1003: a counter 1005 which is incremented each time the test is performed;
- for each within test or between 1003: a counter 1007 which is incremented each time the test fails; and
- for each result cache 1004: a counter 1009 which is incremented each time a data item is written to the result cache and decremented each time a data item is deleted from the result cache.

Using the values from these counters, it is possible to determine the condition element significance of the condition elements in rule 601.

Determining the Cross Product Group

The cross product group to which a condition element belongs is determined by making a graph of the type shown in FIG. 11. In graph 1101, each condition element 603 is represented by a node 1103. Each node 1103 has edges 1105 connecting it to the nodes for condition elements with which it shares between tests. Thus, condition element 603(2) has between tests for the variables <in>, <src1> and <src2>. Condition element 603(2) shares the variable <in> with condition element 603(1), the variable <src1> with condition element 603(4), and the variable <src2> with condition element 603(5). Consequently, node 1103 for condition element 603(2) has edges 1105 connecting it with the nodes 1103 for condition elements 603(1,4, and 5). In a preferred embodiment, graph 1101 is represented by a data structure in which there is a record for each condition element 603 and attached to the record a linked list representing the edges connecting the node for the condition element to the other nodes. Each element of the linked list specifies the variable shared by the condition elements and contains a pointer to the node representing the other condition element.

The Reordering Algorithm

As previously pointed out, the flow of data items in a decision network is minimized by ordering the condition elements into cross product groups of decreasing condition element significance and ordering the condition elements within each cross product group on the basis of cross product effect. In a preferred embodiment, that ordering is done by using the graph of FIG. 11 and the values collected by instrumentation 1001 in the algorithm shown in FIG. 12. Algorithm 1201 has three parts: calculating the restrictiveness of the condition elements, ordering the condition elements into cross-product groups, and ordering the condition elements within the cross-product groups on the basis of cross product effect. In the following, all three parts will be explained in detail, beginning with the calculation of the restrictiveness.

Calculating Restrictiveness

Portion 1203 of algorithm 1201 computes the restrictiveness of each condition element according to the following formula: The coefficients in the formula have been determined empirically, producing the following evaluation function:

$$\text{restrictiveness}(CE) = \\ coeff1 * wtest + coeff2 * btest + coeff3 * test\_qual\_mean - \\ coeff4 * wme\_size\_dev + coeff5 * ce\_freq\_dev$$

where wtest is the number of within-tests. btest is the number of between-tests. test_qual_mean is the mean of all between-test qualities for the CE (condition elements, where between-test quality is the ratio between the times a between-test fails and the times the between-test is done. wme_size_dev is the deviation of the memory size of the CE from the mean: wme_size_dev=(memory_size—mean_memory_size)/mean_memory_size. mean_memory_size is the mean of the memory sizes of all the condition elements of the rule being evaluated. ce_freq_dev is the deviation of the frequency of the CE from the mean: ce_freq_dev=(ce_freq—ce_freq_mean)/ce_freq_mean. ce_freq_mean is the mean of the frequencies of the condition elements of the rule under evaluation. coeff1–coeff5 are 4.0, 1.0, 2.0, 3.0, and 0.01, respectively. All these terms increase the CE restrictiveness except for wme_size_dev, which has a negative contribution.

The coefficients were determined by means of the following experiment: Given the evaluation function, one coefficient is selected and the rest are set to a constant value, e.g., 1.0. Different values are assigned to the selected CE, and for each of these values a rule system is executed. The value that yields the best results is kept. In this way an initial value is obtained for each coefficient. The process is repeated using these new values until the coefficients yield good results for every rule system tested.

The following example illustrates the use of the formula: If decision net 419 is instrumented and the program containing rule 601 is executed for a while (more than 5000 firings of the rules) and the values of the counters are used to determine the restrictiveness of the condition elements using the above function, we obtain the following results.

| CE | wtest | btest | wme_size_dev | ce_freq_dev | test_qual_mean | restrictiveness |
|----|-------|-------|--------------|-------------|----------------|-----------------|
| 0  | 3.    | 0     | −0.996114    | −0.087935   | —              | 14.987463       |
| 1  | 1.3   | 2     | −0.953368    | −0.543967   | 0.900000       | 11.854664       |
| 2  | 1.    | 3     | 0.779793     | 13.365031   | 0.997817       | 6.789905        |
| 3  | 1.    | 2     | 0.779793     | 13.365031   | 0.997817       | 5.789905        |
| 4  | 1.    | 1     | 0.177461     | 6.980573    | 0.996044       | 6.529511        |
| 5  | 1.    | 1     | 0.177461     | 6.980573    | 0.995956       | 6.529335        |

-continued

| CE | wtest | btest | wme_size_dev | ce_freq_dev | test_qual_mean | restrictiveness |
|---|---|---|---|---|---|---|
| 6 | 1. | 3 | 0.177461 | 6.980573 | 0.994920 | 8.527263 |
| 7 | 2. | 2 | −0.895078 | 0.368098 | 0.900000 | 14.488915 |
| 8 | 1. | 3 | 0.779793 | 13.365031 | 0.996725 | 6.787721 |
| 9 | 1. | 2 | 0.779793 | 13.365031 | 0.997817 | 5.789905 |
| 10 | 2. | 1 | −0.984456 | 0.368098 | 0.775000 | 13.507049 |
| 11 | 1. | 3 | 0.177461 | 6.980573 | 0.661170 | 7.859763 |

For instance, CE 603(10) has two within-tests and one between-test. The deviation of its memory size from the mean is −0.984456, i.e., it is a CE with few data items in its result cache memory—the closer wme_size_dev is to −1.0, the smaller the memory size. The deviation of the frequency of CE 603(10) from the mean is 0.368098—i.e., this CE is more frequent than the average. The mean of the test qualities for CE 603(10) is 0.775000. The combination of all these terms gives the value 13.50704, representing the restrictiveness of CE 10 within the rule. CE 603(0) has no value assigned to test_qual_mean because it has no between-tests. The second CE 603(2) of rule 601 has a special within-test: a disjunction test. In a disjunction test, the more values there are, the less restrictive the test. If n is the number of values, 1/n is added to the counter for within-tests; this ratio was determined empirically. The within-test in CE 603(2) checks whether the opcode is "+", "−", or "*." It contains a disjunction with a list of three values. Thus the total number assigned to the counter is 1+⅓=1.3. Applying these results, when condition elements 603 are ordered by restrictiveness, they have the order {0, 7, 10, 1, 6, 11, 2, 8, 4, 5, 3, 9}.

Ordering the Condition Elements into Cross-Product Groups

Portion 1204 of algorithm 1201 orders the condition elements into cross-product groups. The algorithm employs both the list of condition elements which has been ordered by restrictiveness and the graph of FIG. 11. The "leader" referred to in the algorithm is the most restrictive condition element left in the list of condition elements. That condition element is placed on a list of selected condition elements. Then the "successors" of the leader are added to another list, the list of candidate condition elements. The "successors" of the leader are those nodes in the graph of FIG. 11 that fill two conditions:

- An edge of the graph connects them directly to the leader; and
- They have not already been added to the list of selected condition elements.

More specifically, the algorithm proceeds as follows with the condition elements of rule 601: Initially, list contains the whole set of CEs 603, and list_of_candidates and list_of_selected are both empty lists.

```
list = {0, 1, 2, 3, 4, 5, 6, 7, 8, 9, 10, 11}
list_of_candidates = {}
list_of_selected = {}
```

CE 603(0) is promoted to leader, but because it has no connection to any other CE 603 (See FIG. 11), it has no successors. There is nothing to add to list_of_candidates. Thus,

```
leader = 0
list = {1, 2, 3, 4, 5, 6, 7, 8, 9, 10, 11)
list_of_selected = {0}
succ(0) = {}
list_of_candidates = {}
list = {1, 2, 3, 4, 5, 6, 7, 8, 9, 10, 11}
```

Because list_of_candidates is empty, a new leader must be selected. CE 603(7) is the most restrictive CE in list, and its successors are now candidates. Note that CE 603(6) is not considered a successor of CE 603(8) because there is no explicit connection between them (See FIG. 11).

```
leader = 7
list = {1, 2, 3, 4, 5, 6, 8, 9, 10, 11}
list_of_selected = {0, 7}
succ(7) = {8, 9}
list_of_candidates = {8, 9}
list = {1, 2, 3, 4, 5, 6, 10, 11}
```

Before selecting a CE 603 from list_of_candidates, the potential cross product is estimated.

| CE | tests | 1-qual | memsize | prod |
|---|---|---|---|---|
| 8 | <bitin> | .072031 | 458 | 32.989986 |
| 9 | <bitou> | .082009 | 458 | 37.559986 |

CE 603(8) is selected and its successors are added to list_of_candidates, so:

```
selected = 8
list_of_selected = {0, 7, 8}
succ(8) = {3, 10}
list_of_candidates = {3, 9, 10}
list = {1, 2, 4, 5, 6, 11}
```

| CE | tests | 1-qual | memsize | prod |
|---|---|---|---|---|
| 3 | <outpu> | .074061 | 458 | 33.919998 |
| 9 | <bitou> | .082009 | 458 | 37.559986 |
| 10 | <bitsr2> | .294750 | 4 | 1.179000 |

After the potential cross product evaluation, CE 603(10) is selected. Because all CEs connected to it have been selected already, there is nothing to add to list_of_candidates. The lists are now

```
selected = 10
list_of_selected = {0, 7, 8, 10}
succ(10) = {}
```

```
list_of_candidates = {3, 9}
list = {1, 2, 4, 5, 6, 11}
```

The potential cross product is re-evaluated.

| CE | tests | 1-qual | memsize | prod |
|---|---|---|---|---|
| 3 | <outpu> | .074061 | 458 | 33.919998 |
| 9 | <bitou> | .082009 | 458 | 37.559986 |

CE 3 is selected, and CE 603(1) and CE 603(6) become candidates. The variables and lists are now

```
selected = 3
list_of_selected = {0, 7, 8, 10, 3}
succ(3) = {1, 6}
list_of_candidates = {1, 6, 9}
list = {2, 4, 5, 11}
```

The potential cross product is re-evaluated.

| CE | tests | 1-qual | memsize | prod |
|---|---|---|---|---|
| 1 | <out> | .022140 | 12 | 0.265676 |
| 6 | <outpu> | .054826 | 303 | 16.612154 |
| 9 | <bitout> | .082009 | 458 | 37.559986 |

CE 603(1) is selected, and CE 603(2) is added to list_of_candidates. The variables and lists are now

```
selected = 1
list_of_selected = {0, 7, 8, 10, 3, 1}
succ(1) = {2}
list_of_candidates = {2, 6, 9}
list = {4, 5, 11}
```

The potential cross product is re-evaluated.

| CE | tests | 1-qual | memsize | prod |
|---|---|---|---|---|
| 2 | <in> | .012162 | 458 | 5.569986 |
| 6 | <outpu> | .054826 | 303 | 16.612154 |
| 9 | <bitou> | .082009 | 458 | 37.559986 |

CE 603(2) is selected, and CE 603(4) and CE 603(5) are the new candidates. The variables and lists are now

```
selected = 2
list_of_selected = {0, 7, 8, 10, 3, 1, 2}
succ(2) = {4, 5}
list_of_candidates = {4, 5, 6, 9}
list = {11}
```

The potential cross product is re-evaluated.

| CE | tests | 1-qual | memsize | prod |
|---|---|---|---|---|
| 4 | <src1> | .033837 | 303 | 10.252626 |
| 5 | <src2> | .043883 | 303 | 13.296405 |
| 6 | <outpu> | .054826 | 303 | 16.612154 |
| 9 | <bitou> | .082009 | 458 | 37.559986 |

CE 603(4) is selected, and there are no new candidates. The variables and lists are now

```
selected = 4
list_of_selected = {0, 7, 8, 10, 3, 1, 2, 4}
succ(4) = {}
list_of_candidates = {5, 6, 9}
list = {11}
```

The potential cross product is re-evaluated.

| CE | tests | 1-qual | memsize | prod |
|---|---|---|---|---|
| 5 | <src2> | .043883 | 303 | 13.296405 |
| 6 | <outpu> | .054826 | 303 | 16.612154 |
| 9 | <bitou> | .082009 | 458 | 37.559986 |

CE 603(5) is selected, and there are no new candidates. The variables and the lists are now

```
selected = 5
list_of_selected = {0, 7, 8, 10, 3, 1, 2, 4, 5}
succ(5) = {}
list_of_candidates = {6, 9}
list = {11}
```

The potential cross product is re-evaluated.

| CE | tests | 1-qual | memsize | prod |
|---|---|---|---|---|
| 6 | <outpu> | .054826 | 303 | 16.612154 |
| 9 | <bitbu> | .082009 | 458 | 37.559986 |

CE 603(6) is selected, and CE 603(11) becomes candidate. The variables and lists are now

```
selected = 6
list_of_selected = {0, 7, 8, 10, 3, 1, 2, 4, 5, 6}
succ(6) = {11}
list_of_candidates = {9, 11}
list = {}
```

The potential cross product is re-evaluated.

| CE | tests | 1-qual | memsize | prod |
|---|---|---|---|---|
| 9 | <bitou> | .082009 | 458 | 37.559986 |
| 11 | <bo> | .555958 | 303 | 168.455322 |

CE 603(9) is selected, and there are no new candidates. The variables and lists are now

```
selected = 9
list_of_selected = {0, 7, 8, 10, 3, 1, 2, 4, 5, 6, 9}
succ.(9) = {}
list_of_candidates = {11}
list = {}
```

The potential cross product is re-evaluated. Note that before CE 603(9) was selected, the connection between CE 603(11) and the selected CEs was the test <bo>. Once CE 603(9) is selected, the test <bitoup> becomes active; because its test quality is higher than that of <bo>, the potential cross product drops from 168.45 to 31.18. This case shows why the potential cross product must be re-evaluated each time a CE is added to list_of_selected.

| CE | tests | 1-qual | memsize | prod |
|----|-------|--------|---------|------|
| 11 | <bitoup>,<bo> | .102925 | 303 | 31.186241 |

CE 603(11) is selected, and there are no new candidates. The variables and lists are now

```
selected = 11
list_of_selected = {0, 7, 8, 10, 3, 1, 2, 4, 5, 6, 9, 11}
succ(11) = {}
list_of_candidates = {}
list = {}
```

Because there are no candidates, a new leader must be selected from list. Because there is nothing left in list, the program ends. The resulting sequence of CEs 603 is given by

```
list_of_selected:
{0, 7, 8, 10, 3, 1, 2, 4, 5, 6, 9, 11}.
```

Reorderings Required by the Decision Making System

The reordering accomplished by Section 1204 of algorithm 1201 may be subject to other conditions having to do with the manner in which the decision making system operates. These conditions must be applied to the reordered list as required by the individual decision making system. Section 1209 of algorithm 1201 performs these reorderings for the OPS5 system in which the preferred embodiment is implemented. In the following, first the restrictions and then their consequences for the algorithm will be presented.

Restrictions on the OPS5 System

In the OPS5 system, there are certain restrictions on the reorderings possible with negated condition elements. Rule 601 contains no such negated condition elements, but the rule push_pyramid does, namely the condition element—(block ^on <id1>). The restrictions on the reorderings are the following:

1. The first condition element cannot be negated;
2. The first condition element depends on which conflict resolution strategy OPS5 employs;
3. A condition element with a test other than=must not precede the condition element binding the variable; and
4. If a negated condition element has one or more variables, it must be located after the non-negated condition elements that bind those variables.

Details concerning these restrictions follow.

Concerning the second restriction, there are two strategies for conflict resolution in OPS5: LEX and MEA. They differ in that the second places extra emphasis on the recency of the WME that matches the first CE of the rule. If the current strategy is means-end analysis (MEA), the first CE in the new sequence must be the first CE in the original sequence.

Concerning the third restriction, a CE with a test other than=, i.e., <>, <=>, <, <=, >=, or >, must not precede the CE binding the variable. Consider the following sequence of condition elements:

```
(p pp
   (class_a ^attr1 a1 ^attr2 a2)
   (class_b ^attr1 > <var1> ^attr2 a2)
   (class_c ^attr1 <var1> ^attr2 a1)
   -->
   ...)
```

The second CE has a>test when var1 has not been bound yet, making this sequence of condition elements illegal.

Concerning the fourth restriction, if a negated CE has one or more variables, it must be located after the non-negated CEs that bind those variables.

Figure 9:
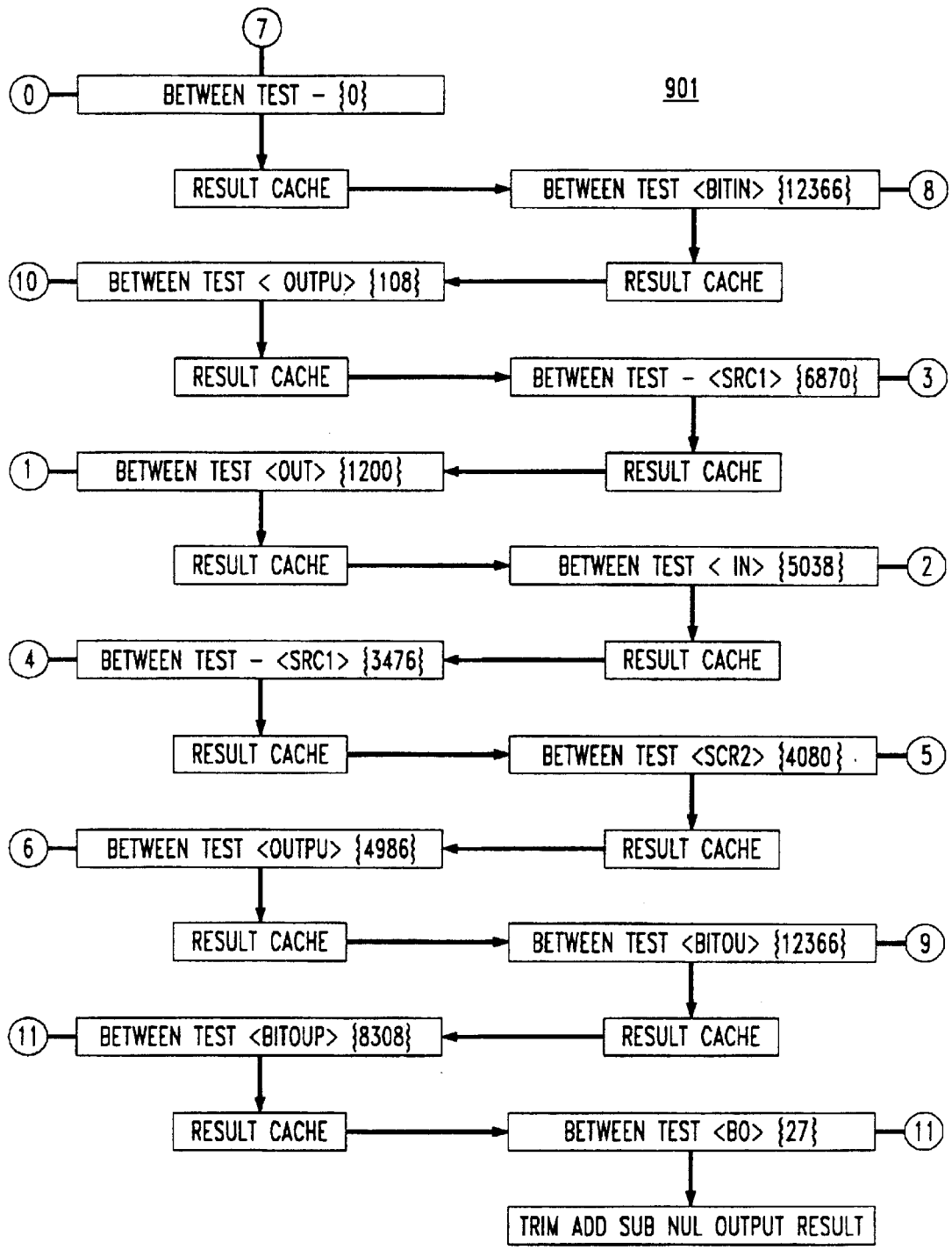
FIG. 9 is the second part after optimization according to the invention.

FIGS. 7 and 9 show the decision net 901 which results when the condition elements of rule 601 are reordered by the algorithm. In decision net 901, the largest number of between tests in any between test node is 12366, as opposed to the 370,980 between tests in one between test node of decision net 801. The total number of between tests has been reduced from 419,374 to 58,825. Moreover, the largest part of the reduction in the number of between tests is in the latter part of decision network 901.

Reordering Within-tests

In a preferred embodiment, decision net 901 is made still more efficient by reordering the within tests in a within test node so that the most restrictive within test comes first. The most restrictive within test is the one whose percentage of failures is highest. That value can of course be obtained from the counters employed with each within test.

Figure 13:
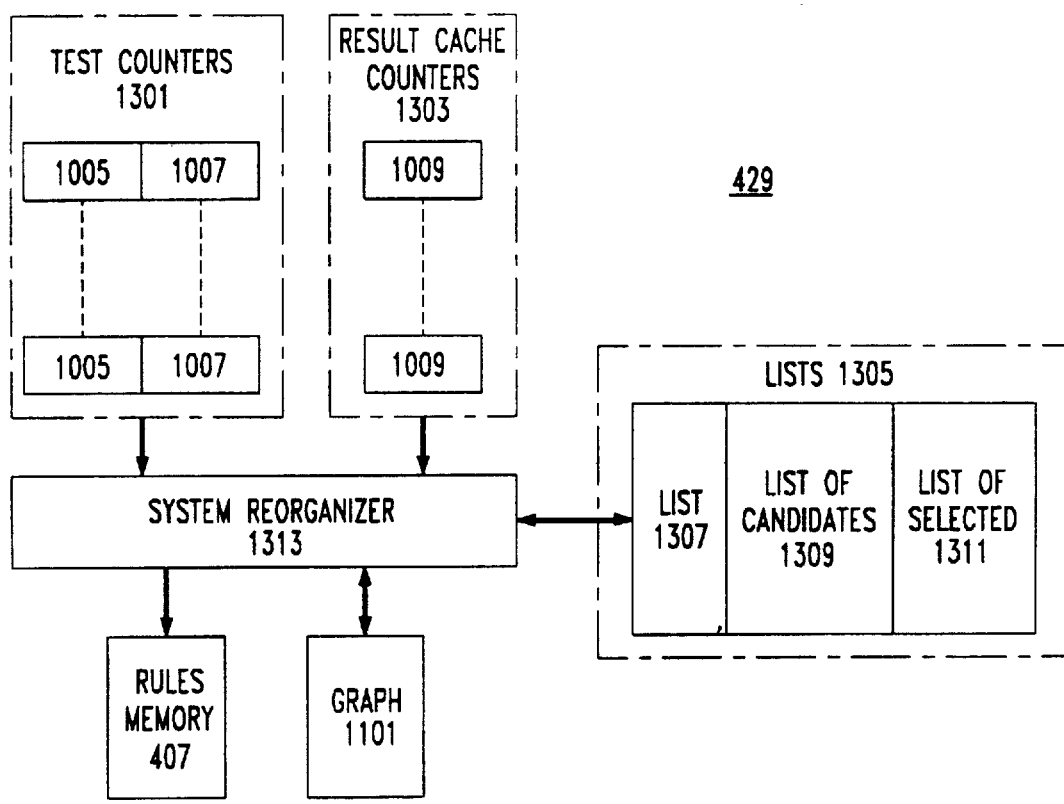
FIG. 13 is a detailed block diagram of a preferred embodiment of analyzer 429.

Details of Analyzer 429: FIG. 13

FIG. 13 is a detailed block diagram of analyzer 429, which executes algorithm 1201 in a preferred embodiment. The part of analyzer 421 which actually executes the algorithm is system reorganizer 1313. The data it works with includes test counters 1301, which contain counter 1005 and 1007 for each test performed in the decision network, and result cache counters 1303, which contains counters for each result cache in the decision network. As shown by the arrows, system reorganizer 1313 reads the counters and uses the values as described above to determine the restrictiveness of each condition element. The result of this process is list 1307 of the condition elements, which is ordered by restrictiveness, with the most restrictive condition element first. As described in detail above, the next step is to use graph 1101 and list 1307 to produce a list of selected condition elements 1311. That list, finally, is reorganized as required by the particular decision making system. Thereupon, system reorganizer 1313 reorganizes rules in rule memory 403.

Detailed Operation of System 401

As already described, a preferred embodiment of system 401 has two modes: a training mode and an operation mode. In training mode, the counters are operating; in operation mode, they are not. The commands used to set up and run the preferred embodiment in operating mode are make, which adds data items to the system and modifies the state of the decision net as required for the new data item, remove, which removes data items and modifies the state of the decision net, and run, which applies the data items to the rules. The parallel commands in training mode are make_et, remove_et, and run_et. The difference is that when these commands are executed, the counters are operating.

When training is completed, system 401 is reorganized by means of the beta command. when executed, that command employs the algorithm described above to reorder the condition elements in the rules and then builds a new decision net 419 as required by the reordered rules.

Training is made easier by the store and recover commands. store saves the state of the counters in a file, so that training can be interrupted and resumed later on; recover simply reads the file with the values saved by store and sets the counters to them.

Statistics about system 401 may be collected using the info, tests, and save_order commands. info shows the current state of decision network 419: how many nodes of each type it has and other information including the number of rules fired, the number of tests done, and the number of tests failed. tests gives the number of between-tests executed in each rule. The command save_order, finally, shows the new condition element sequence generated by the beta command.

Conclusion

The foregoing Detailed Description has disclosed to those of ordinary skill in the art to which the invention pertains how to make and use decision making apparatus which is able to optimize itself in response to a sample of the data with which it is to be used. While the preferred embodiment is the best mode presently known to the inventors of implementing the invention, it will be immediately apparent to those skilled in the art that many other embodiments of the principles of the invention are possible.

For example, the preferred embodiment is implemented in a rule-based system; however, the principles of the invention may be employed in any system which applies tests to large numbers of data items. The preferred embodiment further employs a decision network and works by ordering condition elements such that the decision network is optimized; the principles of the invention are however not restricted to decision networks, but may be employed in any arrangement where optimization can be achieved by changing the order in which decision criteria are applied to the data. Similarly, the preferred embodiment employs counters to instrument the decision network; in other embodiments, instrumentation suitable to the techniques employed in those embodiments to apply decision criteria may be employed. Of course, the formulas used to determine restrictiveness of condition elements will vary with the instrumentation employed in the apparatus.

The preferred embodiment also has separate test and operation modes; other embodiments may operate in a continuous operation mode in which the instrumentation is always active and the analyzer periodically employs the results of the instrumentation to reorder the condition elements. Such an embodiment would automatically and dynamically adjust to changes in the data to which the decision criteria were being applied. Finally, the preferred embodiment is implemented using the OPS5 rule-based system; as pointed out in the Detailed Description, the embodiment consequently reflects certain peculiarities of that system; implementations of the principles in other systems would of course reflect the peculiarities of those systems.

As is apparent from the foregoing, the preferred embodiment is only one of many possible implementations of the principles of the invention. That being the case, the foregoing Detailed Description is to be understood as being in every respect illustrative and exemplary, but not restrictive, and the scope of the invention disclosed herein is not to be determined from the Detailed Description, but rather from the claims as interpreted in light of the Detailed Description and with the full breadth permitted by the law.

What is claimed is:

1. Apparatus for making a decision, comprising:

means for applying decision criteria in a predetermined order to data and the apparatus having the improvement in combination therewith comprising;

optimization means for responding to the data by automatically altering the means for applying decision criteria to change the order in which the means for applying the decision criteria applies the decision criteria to the data so that the number of times the decision criteria are applied to the data in making the decision is reduced, the optimization means responding to the data so as to apply the criteria in descending order of the number of data items excluded by the criteria, or so as to last apply those criteria which affect those data items which are changing most rapidly.

2. The apparatus set forth in claim 1 wherein the optimization means comprises:

instrumentation means for automatically recording information about application of the decision criteria during operation of the apparatus on the data; and analysis means for automatically changing the order in response to the information.

3. The apparatus set forth in claim 2 wherein the optimization means further comprises:

condition elements for specifying the decision criteria, each condition element specifying at least one test on a variable representing data to be tested in the condition element and the analysis means determines a restrictiveness for each condition element, uses shared ones of the variables to determine groups of condition elements, and employs the restrictiveness and the groups to change the order of the condition elements.

4. The apparatus set forth in claim 3 wherein the analysis means further comprises:

means for making a list in which the condition elements are ordered by restrictiveness and means for determining the groups by making a representation of a graph of the condition elements in which each condition element is a node of the graph and there is an edge in the graph connecting the node for a given condition element with any nodes for condition elements with which the given element shares at least one of the variables; and the analysis means employs the list and the representation of the graph to change the order of the condition elements.

5. The apparatus set forth in claim 1 wherein the means for applying the decision criteria is a decision network for applying the decision criteria to the data and the optimization means changes the order such that flow of the data in the decision network is minimized.

6. The apparatus set forth in claim 5 wherein the optimization means further comprise:

instrumentation means for automatically recording information about operation of the decision network on the data; and analysis means for automatically changing the order in response to the information.

7. The apparatus set forth in any of claims 1, 2 or 5 wherein:

the order produced by the optimization means further reflects any requirements imposed by the apparatus for making a decision.

8. The apparatus set forth in any of claims 1, 2 or 5 wherein:
   the apparatus has a training mode and an operational mode; and
   the optimization means operates only in the training mode.

9. The apparatus set forth in claim 8 wherein:
   the apparatus operates in the training mode on test data which is representative of the data upon which the apparatus operates in operational mode.

10. The apparatus set forth in claim 8 wherein the optimization means further comprises:
    means for retaining a current state and
    means for saving the current state,
    whereby operation in the training mode may be interrupted and continued.

11. An automatic method of optimizing operation of apparatus for making a decision, the apparatus being of a type in which decision criteria are applied in a predetermined order to data, the method comprising the steps of:
    instrumenting the apparatus to obtain values which indicate how the decision criteria are applied to the data;
    operating the instrumented apparatus on the data; and
    responding to the values obtained as a result of the operation by changing the order in which the decision criteria are applied to the data such that the decision criteria which screen out the greatest number of data items are applied first, or such that the decision criteria which affect those data items which change most rapidly are applied last, the ordering of the data items thereby reducing the number of times the decision criteria are applied to the data in making the decision.

12. The method set forth in claim 11 wherein the decision criteria are specified in condition elements, each condition element specifying at least one test on a variable representing data to be tested in the condition element and the tests including tests on variables shared between the condition elements and the step of responding to the values comprises the steps of:
    determining a restrictiveness for each condition element;
    determining groups of condition elements which share variables; and
    employing the restrictiveness and the groups to change the order of the condition elements.

13. The method set forth in claim 12 further comprising the steps of:
    making a list in which the condition elements are ordered by restrictiveness;
    the step of determining groups of condition elements includes the step of making a representation of a graph of the condition elements in which each condition element is a node of the graph and there is an edge in the graph connecting the node for a given condition element with any nodes for condition elements with which the given element shares at least one of the variables; and
    the step of employing the restrictiveness and the groups employs the list and the representation of the graph.

14. The method set forth in claim 11 wherein the apparatus includes a decision network for applying the decision criteria to the data;

the step of instrumenting the apparatus includes the step of instrumenting the decision network; and
the step of responding to the values includes the step of changing the order such that flow of the data in the decision network is minimized.

15. The method set forth in any of claims 11, 12 or 14 further comprising the steps of:
    placing the apparatus in a training mode prior to performing the steps of instrumenting the apparatus, operating the instrumented apparatus, and responding the values obtained; and
    after changing the order, placing the apparatus in an operational mode in which the steps of the training mode are no longer performed.

16. The method set forth in claim 15 wherein:
    the step of placing the apparatus in a training mode includes the step of providing test data as the data, the test data being representative of the data upon which the apparatus operates in operational mode.

17. The method set forth in claim 15 wherein:
    the steps performed in training mode further includes the step of retaining a current state of the instrumentation and
    the step of restoring the retained current state.

18. Apparatus for making a decision, comprising:
    a decision network for applying decision criteria in a predetermined order to data, the decision criteria including within tests and between tests, the decision network comprising
       first elements which apply the within tests to items of the data,
       result caches which contain items of the data, and
       second elements which apply the between tests to the items of the data contained in the result caches; and
    optimization means for responding to the data by automatically altering the means for applying decision criteria to change the order in which the means for applying the decision criteria applies the decision criteria to the data so that the number of times the decision criteria are applied to the data in making the decision is reduced, the optimization means being operative to change the order such that flow of the data in the decision network is minimized, the optimization means comprising
       instrumentation means for automatically recording information about operation of the decision network on the data, comprising
          first counters on the within tests and the between tests which indicate how many times each test is performed,
          second counters on the within tests and the between tests which indicate how many times a certain result of each test occurs and
          third counters on the result caches indicating the number of items of data in each result cache
       analysis means for automatically changing the order in response to the information, the analysis means responding to the value of the counters.

19. The apparatus set forth in claim 18 wherein the optimization means further comprises
    condition elements specifying the decision criteria and wherein
    the analysis means reorders the condition elements and further comprises
    means for employing the values of the counters to compute a restrictiveness value for each of the condition elements and make a first list of the condition elements which is ordered by decreasing restrictiveness value, and employs the list in reordering the condition elements.

20. The apparatus set forth in claim 18 wherein the analysis means further comprises:
means for specifying cross product groups of the decision criteria and
the analysis means further responds to the specified cross product groups in addition to the values of the counters.

21. The apparatus set forth in claim 20 wherein the optimization means further comprises:
condition elements specifying the decision criteria, the decision statements including tests on variables shared between condition elements; and
the means for specifying cross product groups further comprises a representation of a graph of the condition elements in which each condition element is a node of the graph and there is an edge in the graph connecting the node for a given condition element with any node for a condition element with which the given element shares at least one of the variables.

22. The apparatus set forth in claim 21 wherein the analysis means further comprises
means for employing the values of the counters to compute a restrictiveness value for each of the condition elements; and
means for employing the values of the third counters to compute a cross-product effect of a condition element; and
the analysis means employs the first list, the representation of the graph and the cross product effect to order the condition elements by performing the steps of
1. making a restrictiveness list of the condition elements by order of decreasing restrictiveness:
2. beginning with the first condition element on the restrictiveness list, while there are condition elements left on the restrictiveness list, do:
   a. add the condition element to a selected list and remove it from the restrictiveness list;
   b. use the representation of the graph to determine the condition elements which belong to the same cross product group as the condition element added to the selected list;
   c. add these condition elements to a condition list;
   d. while there are condition elements on the candidates list, do:
      i. use the third values from the third counters to determine which of the condition elements on the candidates list has the largest potential cross product and select that condition element;
      ii. add that condition element to the selected list and remove it from the restrictiveness list; and
      iii. use the representation of the graph to determine any condition elements which belong to the same cross product group as the condition element added to the selected list; and
      iv. add these condition elements to the candidates list.

23. An automatic method of optimizing operation of apparatus for making a decision, the apparatus being of a type in which decision criteria are applied in a predetermined order to data, the apparatus including a decision network for applying the decision criteria to the data, the decision criteria including within tests and between tests, the method comprising the steps of:

instrumenting the apparatus to obtain values which indicate how the decision criteria are applied to the data, the step of instrumenting the apparatus including instrumenting the decision network, the decision network including first elements which apply the within tests to items of the data, result caches which contain items of the data, and second elements which apply the between tests to the items of the data contained in the result caches, the step of instrumenting the apparatus further including the steps of placing first counters on the within tests and the between tests which produce first values indicating how many times each test is performed, placing second counters on the within tests and the between tests which produce second values indicating how many times a certain result of each test occurs, and placing third counters on the result caches indicating the number of items of data in each result cache; and responding to the values obtained as a result of the operation by changing the order in which the decision criteria are applied to the data to reduce the number of times the decision criteria are applied to the data in making the decision, the step of responding to the values including changing the order such that flow of the data in the decision network is minimized.

24. The method set forth in claim 23 wherein the decision criteria are specified in condition elements and the apparatus is further characterized in that:
the step of responding to the values changes the order of the condition elements and includes the steps of
employing the first, second, and third values to compute a restrictiveness value for each of the condition elements and
making a first list of the condition elements which is ordered by decreasing restrictiveness value.

25. The method set forth in claim 23 wherein the step of responding to the values further includes the steps of:
specifying the cross product groups of the decision criteria; and
employing the cross product groups and the first, second, and third values to change the order.

26. The method set forth in claim 25 wherein the decision criteria are specified in condition elements and the step of specifying cross product groups further includes the steps of:
making a representation of a graph of the condition elements in which each condition element is a node of the graph and there is an edge in the graph connecting the node for a given condition element with any nodes for condition elements with which the given element shares at least one of the variables; and
the step of specifying cross product groups further uses the representation.

27. A method for applying ones of a plurality of decision criteria to data, comprising the steps of:
applying the decision criteria to the data;
analyzing a response of the application of the decision criteria to the data;
producing result data based on the analysis; and
based on the result data, reordering the application of the decision criteria to the data such that each one of the plurality of decision criteria is applied in descending order of the number of data items excluded by each one of the plurality of decision criteria.

28. An apparatus for applying ones of a plurality of decision criteria to data, comprising the steps of:

means for applying the decision criteria to the data;

means for analyzing the application of the decision criteria to the data and producing result data based on the analysis; and means for reordering the application of the decision to the data based on the result data, the reordering means being operative to reorder the application of the decision criteria such that each one of the plurality of decision criteria is applied in descending order of the number of data items excluded by the application of each one of the plurality of decision criteria.

29. A method for applying ones of a plurality of decision criteria to data, comprising the steps of:

applying the decision criteria to the data;

analyzing a response of the application of the decision criteria to the data;

producing result data based on the analysis; and based on the result data, reordering the application of the decision criteria to the data such that each one of the plurality of decision criteria is applied in ascending order of the rate of change of the data items affected by the application of each one of the plurality of decision criteria.

30. An apparatus for applying ones of a plurality of decision criteria to data, comprising the steps of:

means for applying the decision criteria to the data;

means for analyzing the application of the decision criteria to the data and producing result data based on the analysis; and means for reordering the application of the decision to the data based on the result data, the reordering means being operative to reorder the application of the decision criteria such that each one of the plurality of decision criteria is applied in ascending order of the rate of change of the data items affected by the application of each one of the plurality of decision criteria.

* * * * *